No. 861,806. PATENTED JULY 30, 1907.
L. CHRONIK.
ELECTRODE FOR SECONDARY BATTERIES.
APPLICATION FILED JAN. 2, 1907.
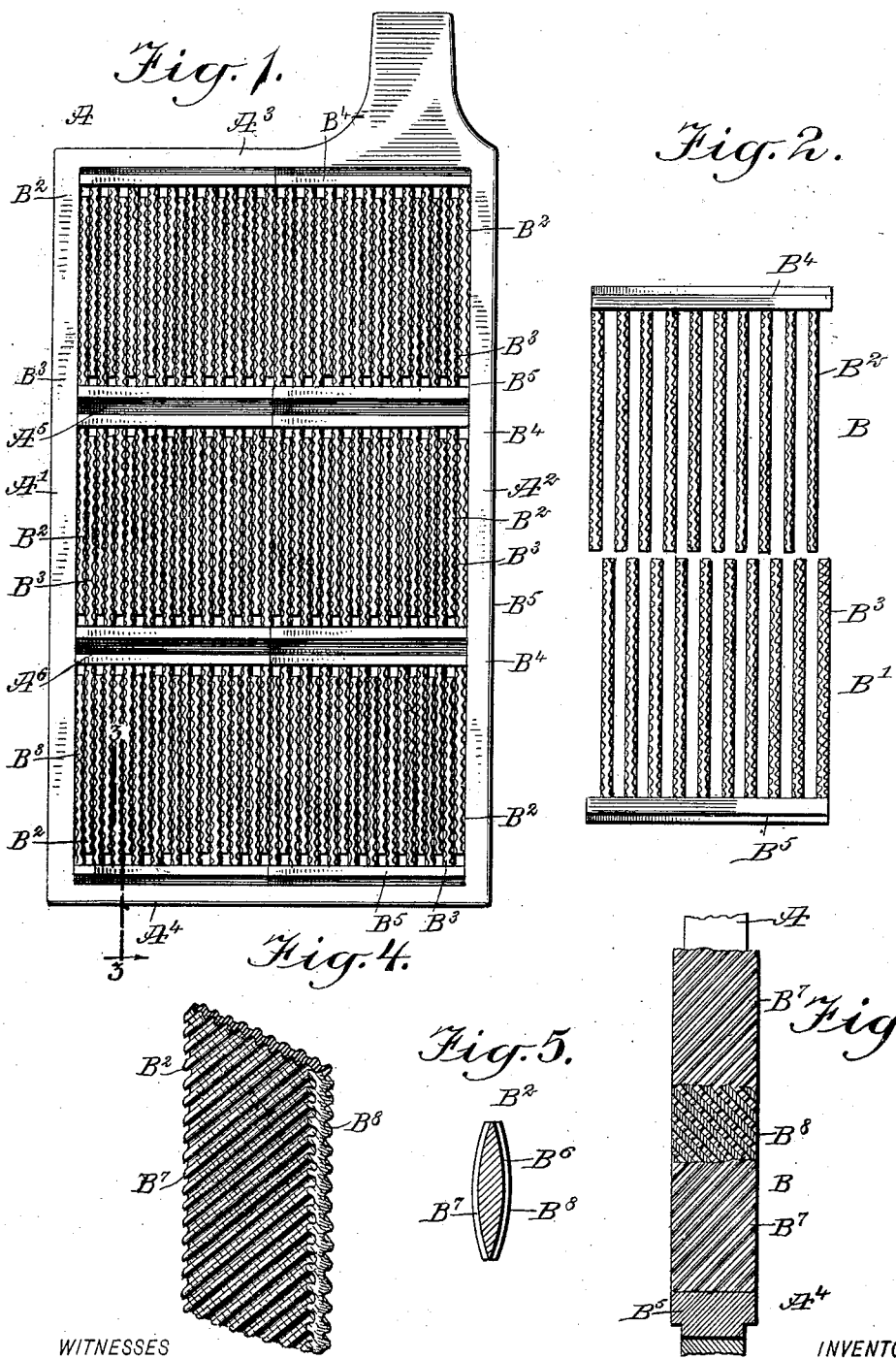
WITNESSES
INVENTOR
Louis Chronik
BY
ATTORNEYS

UNITED STATES PATENT OFFICE.

LOUIS CHRONIK, OF NEW YORK, N. Y.

ELECTRODE FOR SECONDARY BATTERIES.

No. 861,806.   Specification of Letters Patent.   Patented July 30, 1907.

Application filed January 2, 1907. Serial No. 350,340.

*To all whom it may concern:*

Be it known that I, LOUIS CHRONIK, a citizen of the United States, and a resident of the city of New York, (borough of Manhattan,) in the county and State of New York, have invented a new and Improved Electrode for Secondary Batteries, of which the following is a full, clear, and exact description.

The invention relates to secondary or storage batteries of the Planté type having electrodes made of lead and the like, and an electrolytic fluid, such as diluted sulfuric acid.

The object of the invention is to provide a new and improved electrode or battery plate for secondary or storage batteries arranged to provide a very large exposed surface for the electrolyte and to readily retain the absorptive material.

The invention consists of the novel features and parts and combinations of the same which will be more fully described hereinafter and then pointed out in the claims.

A practical embodiment of the invention is represented in the accompanying drawings forming a part of this specification in which similar characters of reference indicate corresponding parts in all the views.

Figure 1 is a face view of the improvement; Fig. 2 is a like view of a pair or set of plate sections separated one from the other; Fig. 3 is an enlarged transverse section of the improvement on the line 3—3 of Fig. 1. Fig. 4 is an enlarged perspective view of a portion of one of the strips; and Fig. 5 is a cross section of the same.

The electrode or battery plate is preferably made of lead and a plurality of such electrodes are held in a cell or a box containing the electrolytic fluid, such as diluted sulfuric acid or the like. The frame A of the electrode is preferably made rectangular in shape, having the side bars $A'$, $A^2$, the top and bottom cross bars $A^3$ and $A^4$, and a number of intermediate cross bars $A^5$ and $A^6$ integrally connected with the side bars $A'$ and $A^2$ and spaced suitable distances apart. The open spaces between the side bars $A'$ and $A^2$ and the cross bars $A^3$, $A^5$, $A^6$, $A^4$, of the frame A are filled with sets or pairs of plate sections B, $B'$ formed of spaced strips $B^2$, $B^3$ secured at one end to bars $B^4$, $B^5$, soldered, or otherwise fastened, to the inner sides of opposite cross bars $A^3$, $A^5$, $A^5$, $A^6$, and $A^6$, $A^4$, as will be readily understood by reference to Fig. 1.

As illustrated in Fig. 1, two such sets or pairs of plate sections B, $B'$ fill the space between adjacent cross bars, but this is immaterial as only a single set or more than two sets of plate sections may be used according to the width of the frame A. Each strip $B^2$, $B^3$ has a body $B^6$ of elliptic or almond shape, as plainly indicated in Fig. 5, and on opposite sides of the said body are formed integral ridges $B^7$, $B^8$ arranged diagonally and in such a manner that the ridges $B^7$ on one side of the body $B^6$ extend or run in an opposite direction to the ridges $B^8$ on the other side of the body $B^6$. The strips $B^2$ or $B^3$ of a plate section B or $B'$ are spaced apart approximately the same distance as the thickness of a bar, so that the strips $B^2$ of one section readily pass between the strips $B^3$ of the other section $B'$, the free ends of the strips $B'$ or $B^3$ terminating a short distance from the corresponding bar $B^5$ or $B^4$, as plainly indicated in Fig. 1. Now, by this arrangement it will be seen that the adjacent faces or sides of two successive strips $B^2$, $B^3$ have their ridges extended in opposite directions, thus forming minute and oblique channels reaching from one face of the electrode to the other face thereof, so as to provide retainers for the active material in the electrolytic fluid. It will also be noticed that by the arrangement described, an exceedingly large exposed surface for the electrolyte is provided and consequently a very effective electrode is provided.

The electrode shown and described is very simple and durable in construction and composed of comparatively few parts, which can be readily assembled and placed in position in the frame A.

Having thus described my invention, I claim as new and desire to secure by Letters Patent:

1. An electrode for secondary batteries, comprising pairs of plate sections, each section comprising a bar having secured thereto spaced strips elliptical in cross section and provided on each side with integral oblique ridges, the ridges on one side running in the opposite direction to the ridges on the other side, said strips being arranged with their widest dimensions transverse to the bar, the strips of one section being arranged between the strips of the other section, substantially as described.

2. A battery electrode comprising a frame having spaced cross bars, and sets of plate sections filling the space between the cross bars and secured thereto, each plate section having a supporting bar and strips secured at one end to the supporting bar, the strips of one set of plate sections being arranged between the strips of the other plate section, and each of the strips having diagonally extending ridges running in opposite directions.

3. An electrode for secondary batteries, composed of pairs of plate sections, each section comprising a bar having secured thereto spaced strips, said strips being arranged with their widest dimensions transverse to the bar, and the strips of one section being arranged between the strips of the other section, the sides of said strips being provided with ridges for the purpose set forth.

In testimony whereof I have signed my name to this specification in the presence of two subscribing witnesses.

LOUIS CHRONIK.

Witnesses:
 THEO. G. HOSTER,
 EVERARD B. MARSHALL.